(12) United States Patent
Funk

(10) Patent No.: US 9,992,976 B2
(45) Date of Patent: Jun. 12, 2018

(54) ANIMAL LIFT

(71) Applicant: INGURAN, LLC, Navasota, TX (US)

(72) Inventor: Ted L. Funk, Savoy, IL (US)

(73) Assignee: Inguran, LLC, Navasota, TX (US)

( * ) Notice: Subject to any disclaimer, the term of this patent is extended or adjusted under 35 U.S.C. 154(b) by 218 days.

(21) Appl. No.: 15/187,966

(22) Filed: Jun. 21, 2016

(65) Prior Publication Data

US 2017/0360006 A1 Dec. 21, 2017

(51) Int. Cl.
*A01K 15/00* (2006.01)
*A01K 1/00* (2006.01)
*A01K 15/04* (2006.01)
*A61D 3/00* (2006.01)

(52) U.S. Cl.
CPC .............. *A01K 15/04* (2013.01); *A61D 3/00* (2013.01); *A01K 1/00* (2013.01)

(58) Field of Classification Search
CPC ...... A01K 1/0613; A01K 13/00; A01K 15/00; A01K 15/04; B66F 7/04; B66F 7/20
USPC ............... 119/753, 728, 729, 749, 751, 757
See application file for complete search history.

(56) References Cited

U.S. PATENT DOCUMENTS

| 1,234,733 A * | 7/1917 | Corington ............ A01K 1/0613 |
| | | 119/722 |
| 3,541,888 A | 11/1970 | Hegar |
| 4,031,858 A * | 6/1977 | Harrington ............. A61D 3/00 |
| | | 119/723 |
| 4,123,993 A * | 11/1978 | Whiteley ............. A01K 1/0613 |
| | | 119/722 |
| 4,309,964 A * | 1/1982 | Young ..................... A61D 3/00 |
| | | 119/723 |
| 5,299,658 A | 4/1994 | Cox et al. |
| 5,383,425 A | 1/1995 | Bleacher |
| 5,738,045 A | 4/1998 | Bleacher |
| 6,435,801 B2 * | 8/2002 | Talbott .................. B60P 1/4407 |
| | | 224/521 |
| 6,477,986 B1 | 11/2002 | Korjenic |
| 6,607,345 B2 * | 8/2003 | McElhany ............ B60P 1/4407 |
| | | 414/462 |
| 6,609,481 B1 * | 8/2003 | McCarty ................ A01K 15/00 |
| | | 119/512 |
| 8,051,807 B2 | 11/2011 | Winders |
| 2002/0168257 A1 * | 11/2002 | Smith .................... B60P 1/4407 |
| | | 414/462 |
| 2006/0182571 A1 * | 8/2006 | Hightower ............. A01K 15/00 |
| | | 414/466 |

(Continued)

FOREIGN PATENT DOCUMENTS

AU 2006235761 B1 3/2007

OTHER PUBLICATIONS

International Search Report dated Sep. 7, 2016 Issued in related PCT/US2016/038521.

*Primary Examiner* — Yvonne R Abbott-Lewis
(74) *Attorney, Agent, or Firm* — Ryan Christensen; Hashim Rahman

(57) ABSTRACT

An animal lift consisting of a lift mechanism, a vertical mast housing at least a portion of the lift mechanism, a horizontal shaft rotatably coupled to the lift mechanism about a longitudinal axis of rotation of the shaft, and a cradle coupled to the shaft, the cradle constructed of a horizontal support member having a surface for engaging the sternum or underbelly of an animal along the animal's longitudinal axis from head to tail and a pair of vertical side walls.

9 Claims, 4 Drawing Sheets

(56) References Cited

U.S. PATENT DOCUMENTS

2009/0078217 A1\* 3/2009 Riley ................... A01K 1/0017
119/723

\* cited by examiner

ANIMAL LIFT

BACKGROUND OF THE INVENTION

In the animal care and husbandry fields, there is a need to restrain and manipulate large animals, including livestock, in order to carry out health maintenance tasks and administer various surgical and non-surgical medical procedures and diagnostic tests. With respect to livestock in particular, it is difficult to safely and efficaciously access the ventral side of the animal without utilizing sedatives or anesthetics and employing significant manpower to manipulate the animal. Thus, there is a need in the animal care and husbandry fields to safely and efficaciously restrain and manipulate large animals.

SUMMARY OF THE INVENTION

The invention generally encompasses an animal lift capable of securing an animal, raising the animal vertically to a desired height and rotating the animal along its longitudinal axis up to 180 degrees. One embodiment of the invention encompasses an animal lift comprising: a lift mechanism; a vertical mast housing at least a portion of the lift mechanism; a horizontal shaft rotatably coupled to the lift mechanism about a longitudinal axis of rotation of the shaft; and a cradle coupled to the shaft, the cradle comprising i) a horizontal support member having a surface for engaging the sternum or underbelly of an animal along the animal's longitudinal axis from head to tail, and ii) a vertical side wall.

In a particular embodiment of the invention, the horizontal support member comprises a flat surface for engaging the sternum or underbelly of an animal. In a further embodiment, the horizontal support member has a rectangular cross-section and is approximately 78 inches long, 5 inches wide and 2.5 inches high (i.e., 78 inches×5 inches×2.5 inches). In another embodiment, the horizontal support member is 50-100 inches long, 3-12 inches wide and 1-4 inches high.

In another embodiment, the cradle further comprises a second vertical sidewall. In a further embodiment of the invention, one or two vertical sidewalls are attached to the horizontal support member, or to the horizontal shaft, by one or more attachment members. In a particular embodiment, the attachment members are adjustable in length so as to allow the cradle to be widened or narrowed, and/or the vertical side walls to be raised or lowered, as necessary to accommodate an animal. In yet a further embodiment, the cradle further comprises cushions or spacers, to place between the animal and the vertical sidewalls. In certain embodiments, the spacers are made of a material that conforms to the outer counter of the animal adjacent to the vertical side walls such as foam (e.g., polyethylene or polyurethane foam) or rubber. In yet another embodiment of the invention, the cradle comprises one or more straps coupled to the support member or the sidewall for restraining the animal. In a further embodiment, the cradle comprises straps for securing the animal. The straps may be constructed of any suitable material, including but not limited to nylon. In a particular embodiment, the straps are attached to the horizontal support member, one or more of vertical sidewalls, one or more attachment members or the horizontal shaft.

In yet another embodiment, the lift mechanism comprises a hydraulic lift mechanism. In a different embodiment, the lift mechanism comprises a pneumatic lift mechanism, including a pneumatic cylinder. In a particular embodiment of the invention, the hydraulic lift mechanism comprises a trolley, a hydraulic cylinder, a lift chain, and mast bearings. In a further embodiment, the hydraulic lift mechanism comprises a hydraulic pump. In yet a further embodiment, the hydraulic lift mechanism comprises a velocity fuse. In yet another embodiment of the invention, the animal lift further comprises a hydraulic control valve positioned on the vertical mast. Any known suitable lift mechanism may be employed in the invention in accordance with the knowledge of one of ordinary skill in the art.

In another embodiment of the invention, the animal lift further comprises a worm drive for rotating the horizontal shaft about its longitudinal axis of rotation. In a particular embodiment, the worm drive is self-locking. In another embodiment of the invention, one end of the horizontal shaft comprises, or is coupled to, a worm wheel. In a further embodiment, the worm screw comprises an axially extending shaft to which a hand crank is attached.

Another embodiment of the invention comprises an animal lift comprising: a lift mechanism; a vertical mast housing at least a portion of the lift mechanism; and a cradle comprising i) a horizontal shaft rotatably coupled to the lift mechanism about a longitudinal axis of rotation of the horizontal shaft, the horizontal shaft having a surface for engaging the sternum or underbelly of an animal along the animal's longitudinal axis from head to tail, and ii) a vertical side wall.

DETAILED DESCRIPTION OF THE INVENTION

Figure 1:
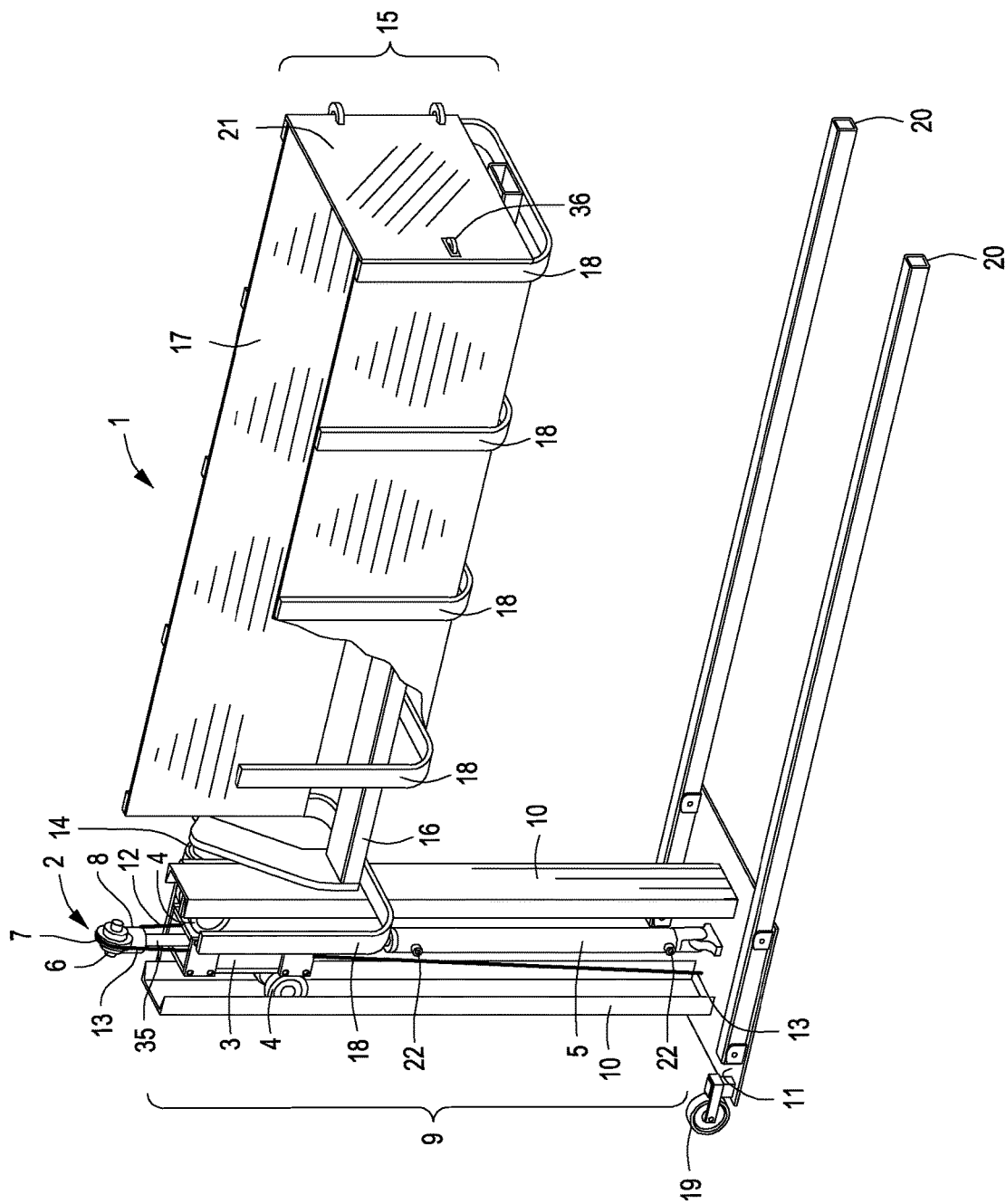
FIG. 1 is a depiction of one embodiment of an animal lift of the invention.

FIG. 1, depicts one embodiment of an animal lift 1. The animal lift 1 as depicted shows a lift mechanism 2, comprising a trolley 3 with mast bearings 4, a hydraulic cylinder 5, including a cylinder rod 35 with yolk 6 and pulley 7, and a lift chain 8. In certain embodiments of the invention (not depicted) a cable can be used instead of lift chain 8. In other embodiments of the invention (not depicted) a pneumatic cylinder can be used instead of hydraulic cylinder 5. The animal lift 1 further comprises a vertical mast 9 comprising two vertical c-channel members 10 in which the trolley 3 resides and a base 11 onto which the c-channel members 10 and the hydraulic cylinder 5 are secured. In certain embodiments, the c-channel members 10 can be coupled to each other anywhere along their length and/or at the top of the animal lift via a cross member or plate. The lift chain 8 is secured to the trolley 3 at one end of the lift chain 12 and to the base 11 at the other end of the lift chain 13 and passes over, and within a groove on, the pulley 7. The animal lift 1 as depicted further comprises a horizontal shaft 14 rotatably coupled to the trolley 3 about a longitudinal axis of rotation of the horizontal shaft 14 and a cradle 15 coupled to the horizontal shaft 14. The cradle 15 comprises a horizontal support member 16 for engaging the sternum or underbelly of an animal along the animal's longitudinal axis from head to tail. The horizontal support member 16, in certain embodiments, can have a flat surface for engaging the sternum or underbelly of the animal. In certain embodiments, animal lift 1 is capable of lifting bovids and swine. Specifically, animal lift 1 is capable of lifting livestock weighing approximately 100-2000 lbs or 100-1000 lbs.

In a particular embodiment, the horizontal support member 16 has a rectangular cross-section and has dimensions of approximately 78 inches long, 5 inches wide and 2.5 inches high. In another embodiment, the horizontal support member 16 has a width of 3-7 inches or 4-6 inches. The cradle 15 as depicted in FIG. 1 further comprises two vertical side walls 17 coupled to the support member 16 along its longitudinal axis with attachment members 18. The width and height of the cradle 15 should be sufficient to accommodate the relevant species of animal. Alternatively, in certain embodiments (not depicted), the attachment members 18 are adjustable in length so as to allow the cradle to be widened or narrowed, and/or the vertical side walls to be raised or lowered, as necessary to accommodate an animal. Attachment members 18 are spaced a sufficient distance from one another, and have a sufficiently low profile, to allow an animal to be easily walked into position over horizontal support member 16. In yet a further embodiment, the animal lift 1 further comprises the use of cushions or spacers (not depicted) to place between the animal and the vertical sidewalls 17. The spacers may be made of a material, such as foam (e.g., polyethylene or polyurethane foam) or rubber, that is able to conform to the outer contour of the animal adjacent to the vertical sidewalls 17.

As depicted in FIG. 1, the base 11 further comprises a pair of wheels 19 that engage the surface on which the animal lift 1 is placed when the animal lift 1 is tilted to a sufficient degree relative to the surface, thereby allowing the animal lift 1 to be moved if desired. The base 11 as shown further comprises two base members 20, which extend from the base 11 parallel to the horizontal support member 16. As shown in FIG. 1, the base members 20 extend a distance to approximately match the length of the cradle 15. The cradle 15 in the embodiment depicted in FIG. 1 further comprises a hinged gate 21 between vertical sidewalls 17 to assist in restraining an animal, especially when the animal lift 1 is in the lowered position and the animal's feet are still contacting the ground. Hinged gate 21 may further comprise a portion of a latch 36 for locking or securing hinged gate 21 in the closed position. One of the vertical sidewalls 17, or attachment members 18, may comprise the other portion of the latch 36. Also depicted in FIG. 1 are fluid inlets 22 on the hydraulic cylinder 5 through which hydraulic fluid is pumped into the hydraulic cylinder.

In certain embodiments of the invention (not depicted), the animal lift 1 further comprises a hydraulic pump for moving fluid into the hydraulic cylinder 5 via fluid inlets 22. Hoses from a hydraulic pump connect to fluid inlets 22. In yet another embodiment of the invention (not depicted), a velocity fuse may be placed between a fluid inlet 22 of the hydraulic cylinder 5 and the hydraulic pump in order to prevent the animal lift from being abruptly lowered in the event of failure of the hydraulic system.

In an alternative embodiment of the invention (not depicted), the cradle 15 is comprised of horizontal shaft 14, which engages the sternum or underbelly of an animal along the animal's longitudinal axis from head to tail, instead of horizontal support member 16. In this embodiment, the vertical side walls 17 of cradle 15 are coupled to the horizontal shaft 14 via attachment members 18. In such an embodiment, the portion of the horizontal shaft 14 that engages the sternum or underbelly of the animal can be flat.

Figure 2:
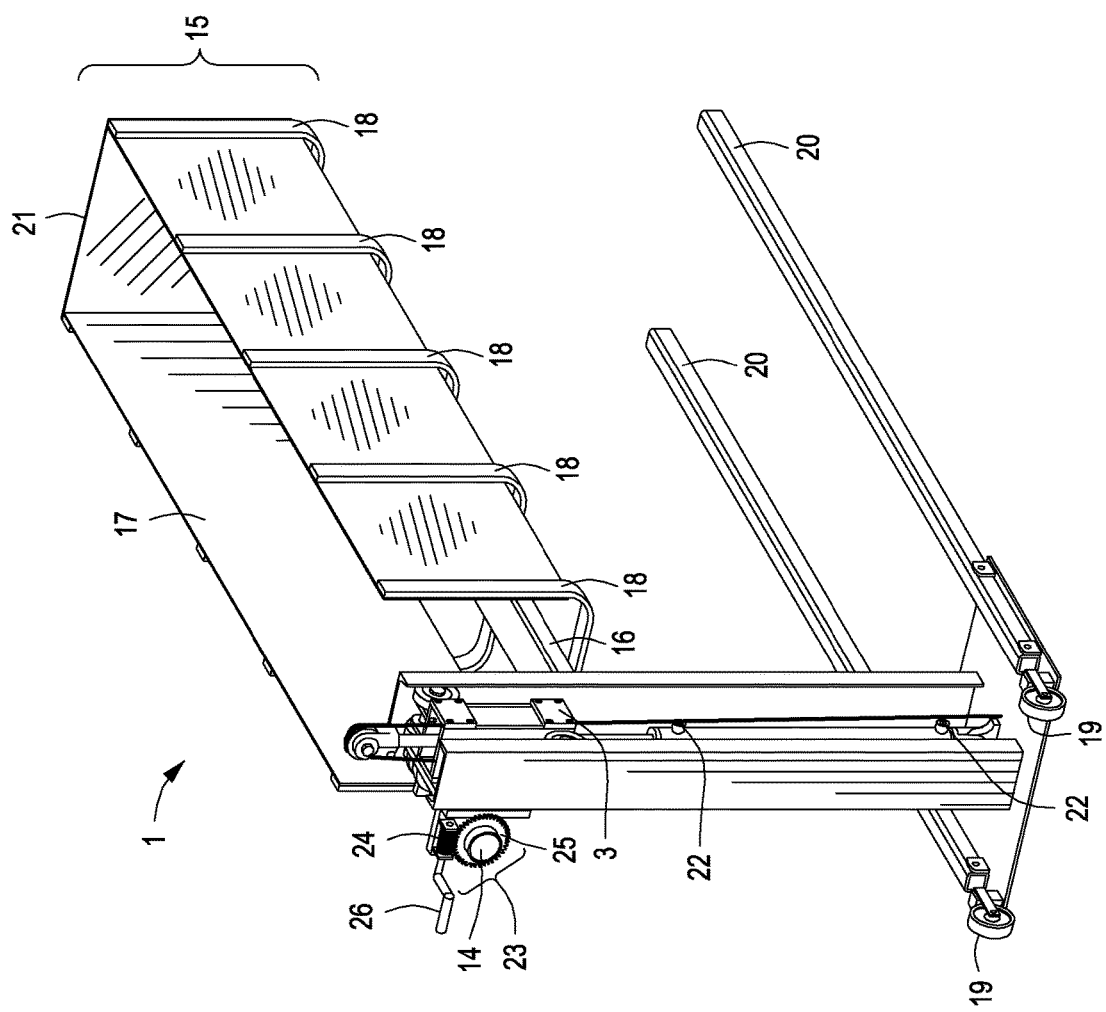
FIG. 2 is an alternate view of one embodiment of an animal lift of the invention.

FIG. 2 depicts one aspect of an embodiment of the animal lift 1 that comprises a worm drive 23. The worm drive 23 is comprised of a worm screw 24 and a worm wheel 25. The worm drive 23 is coupled to the trolley 3. One end of the horizontal shaft 14 comprises, or alternatively is coupled to, the worm wheel 25. As depicted in FIG. 2, the worm screw 24 further comprises an axially extending shaft to which a hand crank 26 is attached. Turning the hand crank 26 causes the horizontal shaft 14 to be rotated about its longitudinal axis, which in turn causes the cradle 15, along with any animal contained therein, to be longitudinally rotated. In certain embodiments of the invention, the worm drive 23 is self-locking.

Figure 3:
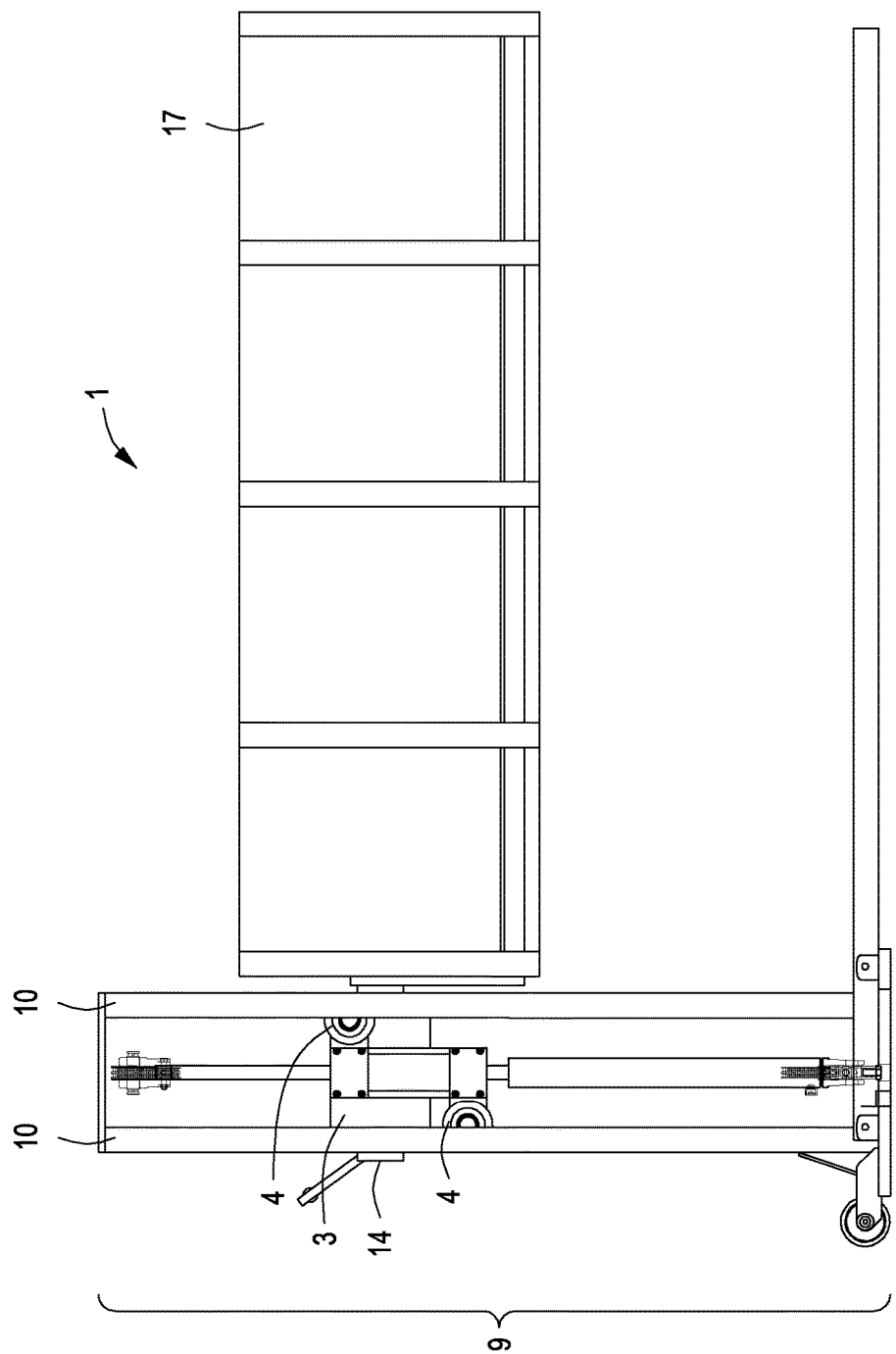
FIGS. 3 and 4 are a front view and a rear view, respectively, of one embodiment of the invention.
Figure 4:
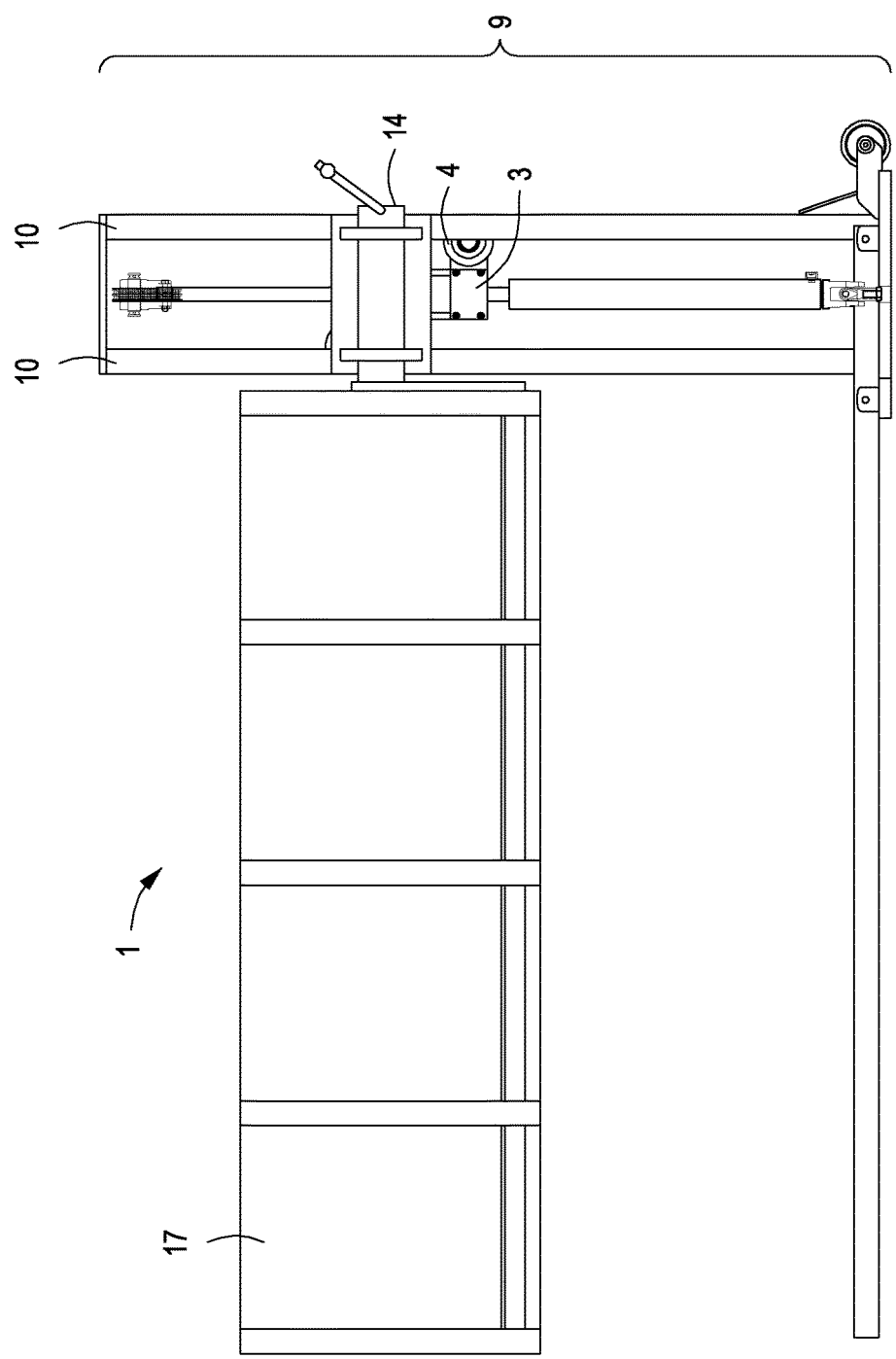

FIGS. 3 and 4 depict one aspect of an embodiment of the animal lift 1. As depicted in FIGS. 3 and 4, a pair of mast bearings 4 engage the inner surface of each c-channel member 10 and allow the trolley 3 to move freely within the vertical mast 9 in the vertical dimension. As depicted in FIG. 3, each pair of mast bearings 4 is attached to the trolley 3 at opposite ends of the trolley 3.

In certain embodiments of the invention, the animal lift 1 is constructed substantially of metal, including but not limited to steel. In particular, in certain embodiments of the invention, certain components of the animal lift 1, including the trolley 3, mast bearings 4, hydraulic cylinder 5, yolk 6, pulley 7, lift chain 8, vertical mast 9, base 11, horizontal shaft 14, cradle 15, vertical side walls 17, attachment members 18, worm drive 23 and/or hand crank 26 are constructed of steel of such metallurgical properties and manufactured to meet industry-accepted specifications for the anticipated loads and required durability. In other embodiments of the invention, other types of metals, including but not limited to aluminum and titanium, can used to construct the components of the animal lift 1, according to the necessary load bearing properties needed for a particular application and as appropriate according to one of ordinary skill in the art. Similarly other materials such as fiberglass and plastics can be utilized in construction of certain components of the invention, as appropriate according to one of ordinary skill in the art.

An example of the animal lift 1 being operated is provided by way of the following non-limiting example. An operator of the animal lift 1 lowers the lift mechanism 2 using a hydraulic control valve located on the vertical mast 9. The cradle 15 is lowered to a height that allows the animal to easily step over the attachment members 18. The animal is positioned so that the cradle's horizontal support member 16 is positioned to engage the sternum or underbelly of the animal along the animal's longitudinal axis from head to tail once the cradle 15 is lifted. As such, the animal's left fore and hind legs should be to the left the horizontal support member 16 and the animal's right fore and hind legs should be to the right of the horizontal support member 16. Once the animal is roughly centered along the longitudinal axis of the cradle 15, the hinged gate 21 is closed. Once the animal is comfortable and in position, the operator begins to lift the cradle 15 via operation of a hydraulic control valve (not depicted) located on the vertical mast 9. The hydraulic control valve is operably coupled to the hydraulic cylinder 5 and allows the operator to raise and lower the cylinder rod 35, and connected yolk 6 and pulley 7, of the hydraulic cylinder 5 so as to raise and lower the cradle 15. The operator raises the cradle to a height where the animal's feet are off of the ground. Once the animal's feet are off of the ground, the animal is examined and/or treated.

In certain embodiments of the invention, the animal is placed into an anesthetized or sedated state either once the animal's feet are off the ground, or prior to the animal's feet being lifted off of the ground but while supported by the horizontal support member 16. After raising the animal to an appropriate height, the operator then turns the hand crank 26, which rotates the horizontal shaft 14 about its longitudinal axis of rotation. In such a manner, the cradle 15 is rotated sufficiently by the operator to deposit the anaesthetized or sedated animal on an examination table in a supine position or on its side. In a particular embodiment of the invention, the cradle 15 is rotated so that the animal is on its side or in a near supine position while in the cradle 15, and then the animal is slid out of the cradle 15 along one of the vertical sidewalls 17 and onto an examination table by the operator or additional personnel.

Those of ordinary skill in the art will recognize that the invention described above includes many inventive embodiments and is not limited to any particular embodiment shown in the drawings.

What is claimed is:

1. An animal lift comprising:
   a lift mechanism;
   a vertical mast housing at least a portion of the lift mechanism;
   a horizontal shaft rotatably coupled to the lift mechanism about a longitudinal axis of rotation of the shaft; and
   a cradle coupled to the shaft, the cradle comprising i) a horizontal support member having a surface for engaging the sternum or underbelly of an animal along the animal's longitudinal axis from head to tail, and ii) a vertical side wall.

2. The device of claim 1, wherein the support member surface comprises a flat surface.

3. The device of claim 1, wherein the cradle further comprises a second vertical sidewall or one or more straps coupled to the horizontal support member or the first vertical sidewall.

4. The device of claim 1, wherein the lift mechanism comprises a hydraulic lift mechanism.

5. The device of claim 4, wherein the hydraulic lift mechanism comprises a hydraulic cylinder, a lift chain, and mast bearings.

6. The device of claim 4, wherein the hydraulic lift mechanism comprises a velocity fuse.

7. The device of claim 1, further comprising a self-locking worm drive for rotating the shaft about the longitudinal axis of rotation.

8. The device of claim 1, further comprising a hydraulic control valve positioned on the mast.

9. An animal lift comprising:
   a lift mechanism;
   a vertical mast housing at least a portion of the lift mechanism; and
   a cradle comprising i) a horizontal shaft rotatably coupled to the lift mechanism about a longitudinal axis of rotation of the horizontal shaft, the horizontal shaft having a surface for engaging the sternum or underbelly of an animal along the animal's longitudinal axis from head to tail, and ii) a vertical side wall.

* * * * *